W. H. GRIFFITH.
COUPLING.
APPLICATION FILED FEB. 1, 1913.
1,083,894.
Patented Jan. 6, 1914.
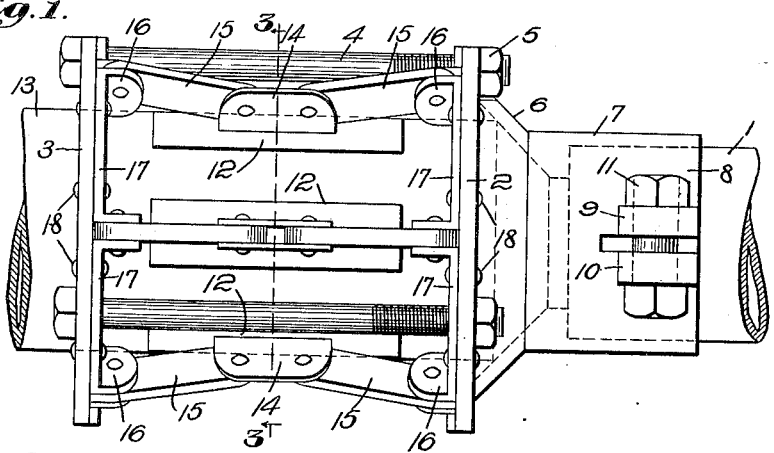
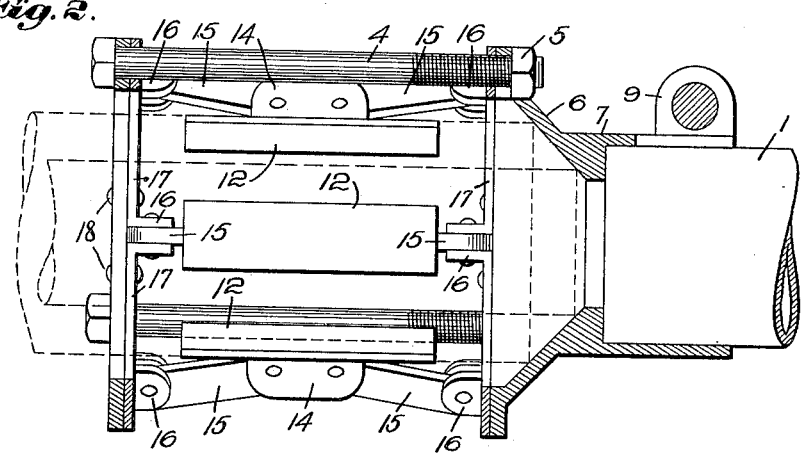
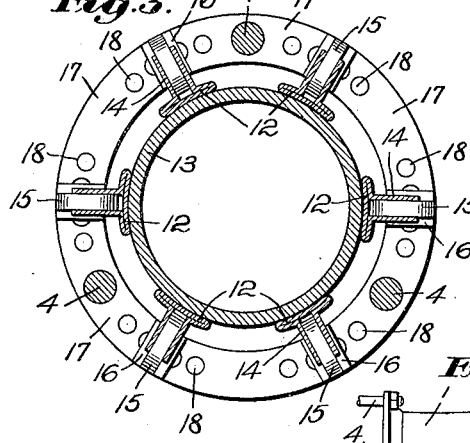
Witnesses:
Horace A. Crossman
Robert H. Kammler
Inventor:
William H. Griffith.
by Emery Booth, Janney Varney
Attys

UNITED STATES PATENT OFFICE.

WILLIAM H. GRIFFITH, OF SOMERVILLE, MASSACHUSETTS, ASSIGNOR OF ONE-HALF TO HARRY L. REED, OF DORCHESTER, MASSACHUSETTS.

COUPLING.

1,083,894. Specification of Letters Patent. Patented Jan. 6, 1914.

Application filed February 1, 1913. Serial No. 745,545.

*To all whom it may concern:*

Be it known that I, WILLIAM H. GRIFFITH, a citizen of the United States, and a resident of Somerville, county of Middlesex, State of Massachusetts, (whose post-office address is No. 1 Bank street, Somerville, Massachusetts,) have invented an Improvement in Couplings, of which the following description, in connection with the accompanying drawings, is a specification, like characters on the drawings representing like parts.

This invention relates to couplings for connecting the ends of pipes either rigid or yielding and is particularly adapted for use in connection with automobile horns and the like, and it may conveniently be secured to the intake pipe of such a horn, to enable the horn thereby to be secured to the exhaust pipe of the automobile which pipe, in practice, varies in diameter with substantially each different make of car.

In the drawing of the form of my invention illustrated and described herein, Figure 1, is a side elevation of my improved coupling; Fig. 2, a vertical longitudinal section thereof, showing in dotted lines pipes of different sizes therein; Fig. 3, a vertical cross-section on the line 3—3, Fig. 1; Fig. 4, a similar view showing the jaws in position to receive a pipe of smaller diameter, and Fig. 5, a modification of the coupling illustrating a construction whereby the coupling member may be made integral with a horn or pipe.

Referring first to Figs. 1 and 2, my improved coupling is shown as secured to the small or intake end 1 of a horn and comprises jaw carrying end members 2, 3 shown as rings of any suitable material, as metal, adjustably connected and secured by means of jaw adjusting and locking members 4, shown as bolts, provided with nuts 5 whereby said ends may be relatively adjusted. The ring 2 is shown herein as provided with an angular portion 6 leading to a reduced neck portion 7 which may be secured to the ring in any desired manner, as by brazing, said reduced portion being provided, if desired, with a split end 8 and suitable clamping means as the ears 9, 10 and bolt 11 whereby it may be removably secured to the horn end 1. The inner and opposed faces of the rings 2 and 3 are provided with any desired number of clamping members or jaws of any convenient type, preferably slightly curved laterally, the more readily to engage the outer face of a pipe 13. The jaws 12 are radially disposed relative to the rings 2, 3 and are each provided with a flange 14 to which are pivotally secured links 15 secured in turn, respectively, to the rings 2 and 3. These links may be secured to the rings in any suitable manner as by providing the rings with a series of ears 16 between which the links are pivoted. These ears, Fig. 3, may be provided in any convenient manner, as for instance, by securing to the iner and opposed faces of the respective rings 2 and 3, a series of segmental members 17 each provided at its ends with an upturned ear 16, said segmental members being secured to the rings conveniently by rivets 8.

To use my improved clamp, the nuts 5 on the bolts 4 are loosened and the rings 2, 3 separated by sliding them on the bolts 4, far enough to open the jaws 12, 12, sufficiently to permit the end of the exhaust or other pipe 13 to be inserted between them. The exhaust pipe is preferably seated between the several jaws 12 against the angular portion 6 which forms a convenient and universal seat therefor, readily permitting the coupling of pipes of different diameters. The rings 2, 3 are then pushed toward each other as far as possible and until the jaws 12 securely grip the pipe 13. The nuts 5 on the bolts 4 are then turned up thus drawing the two rings tightly together, and at the same time throwing the jaws inwardly and closing them tightly about the pipe 13. By this means a very satisfactory connection may be quickly and conveniently made between the horn and an exhaust pipe having any diameter, within certain limits. Obviously the end rings 2, 3 and other parts may be made of any dimensions to take pipes within certain limits, as may be necessary. My improved clamp obviates the necessity of providing clamps of many sizes for use with pipes of different diameters which is both extremely expensive and inconvenient.

In Fig. 5, I have shown a modification wherein the coupling end member 2, may be constructed integral with the horn end 1. It will be readily perceived that by thus constructing a horn and coupling, the necessity for machining the intake end of the horn to receive a coupling is done away with and the novel coupling-equipped end permits the horn to be readily secured to any supply pipe, thus also avoiding the necessity for carrying in stock couplings of different sizes.

Having described one form of my invention which, however, may doubtless be varied without departing from the spirit of the invention. I claim:

1. A coupling for curvilinear members comprising jaw carrying end members having adjustable jaws pivoted thereon for gripping curvilinear members of different exterior diameters at will.

2. A coupling for selected curvilinear members comprising jaw carrying end members having a plurality of radially disposed jaws hinged therebetween.

3. A coupling for selected curvilinear members comprising end members permanently and adjustably connected, each member adapted to receive a curvilinear member therein, and radially adjustable means intermediate said ends to clamp and hold said cylindrical members.

4. An integral coupling for curvilinear members comprising end members adjustably connected, each member adapted to receive a curvilinear member therein and radially adjustable means intermediate said ends to engage and draw together opposed cylindrical members.

5. An integral coupling for curvilinear members comprising end members having a plurality of jaws disposed in substantially a circle therebetween, and means for varying the diameter of said circle and locking said jaws.

6. A coupling for curvilinear members comprising jaw carrying end members adapted to receive curvilinear members therein, one of said end members provided with a curvilinear member end receiving seat on the opposite side of said end member from its jaw and means including said jaws intermediate said ends to engage and draw toward said seat the curvilinear member adjacent thereto.

7. A coupling for curvilinear members comprising end members one of which is provided with a universal curvilinear member end receiving seat and jaws between said end members for locking said curvilinear members together and one curvilinear member to the universal seat.

8. A coupling for curvilinear members comprising end members, one of which is provided with an end receiving seat of substantially fixed diameter and with a beveled end receiving seat and means for centering and locking curvilinear members of different diameters into operative relation relative to said seat.

9. A coupling for curvilinear members comprising end members, one of which is provided with end receiving seats and means, including one of said seats, for centering and locking curvilinear members in operative relation on said seats.

10. A coupling for curvilinear members comprising end members, one of which is provided with a neck portion to receive a cylindrical member and means suspended between said ends for locking at will within said neck end and adjacent to said neck a cylindrical member of different or the same exterior diameter.

11. A coupling for curvilinear members comprising end members one of which is constructed to receive two cylindrical members, and means on and controlled by the positions of said ends for relatively locking said cylindrical members to said end member.

12. A coupling for curvilinear members comprising end members, swinging jaws therebetween adapted to engage a curvilinear member, and means to simultaneously lock said ends against longitudinal movement, and said jaws against lateral movement.

13. A coupling for curvilinear members comprising end rings, jaws secured thereto, jaw adjusting and locking members permanently connecting said rings and means on said adjusting and locking members for actuating them.

14. A coupling for curvilinear members comprising ends, one of which has means for locking thereto a curvilinear member, an inclined seat on said end, and means connecting the ends for seating and locking on said inclined seat a curvilinear member of any diameter within the limits of said seat.

15. A coupling for curvilinear members comprising ends, one of which is provided with adjacent seats, and means actuated by said ends to relatively seat on said seats curvilinear members of the same or varying diameters.

16. A coupling for curvilinear members comprising a cone shaped end, means to seat and lock thereon a curvilinear member, and means to seat and lock thereon a second curvilinear member of any one of a plurality of diameters.

In testimony whereof, I have signed my name to this specification, in the presence of two subscribing witnesses.

WILLIAM H. GRIFFITH.

Witnesses:
   EVERETT S. EMERY,
   ROBERT H. KAMMLER.

---

Copies of this patent may be obtained for five cents each, by addressing the "Commissioner of Patents, Washington, D. C."